United States Patent [19]

Detsikas et al.

[11] Patent Number: 5,373,421

[45] Date of Patent: Dec. 13, 1994

[54] FIBER OPTIC TRANSCEIVER MOUNTING BRACKET

[75] Inventors: Christopher T. Detsikas, Lancaster; Timothy P. Spellman, Ayer, both of Mass.

[73] Assignee: Digital Equipment Corporation, Maynard, Mass.

[21] Appl. No.: 71,158

[22] Filed: Jun. 2, 1993

[51] Int. Cl.⁵ ............................................. H05K 7/02
[52] U.S. Cl. .................................. 361/810; 361/752; 361/788; 361/796; 361/825; 174/17 R; 174/50
[58] Field of Search ............... 361/810, 825, 724, 796, 361/752, 788, 792, 729; 174/17 R, 50

[56] References Cited

U.S. PATENT DOCUMENTS

| | | | |
|---|---|---|---|
| 2,920,244 | 1/1960 | Miksit | 317/99 |
| 3,434,013 | 4/1967 | Kadah | 317/99 |
| 4,498,123 | 2/1985 | Fuss | 361/427 |
| 4,630,175 | 12/1986 | Lerude | 361/425 |
| 4,650,085 | 3/1987 | Davies | 220/4 R |
| 4,956,750 | 9/1990 | Maggalet | 361/415 |

Primary Examiner—Leo P. Picard
Assistant Examiner—Young Whang
Attorney, Agent, or Firm—Kenneth F. Kozik; A. Sidney Johnston

[57] ABSTRACT

An assembly for mounting fiber optic transceivers. A front wall having a plurality of holes is provided. A plurality of mounting members are attached to the rear of the front wall and extend perpendicularly from each of the plurality of holes. The mounting members include a base, a pair of side walls and rear wall coupled to the base, and a flexible clamp member attached to the rear wall. The flexible clamp member includes a pair of short wall portions impressed at each end to provide securing dimples and an integral back wall portion to seat the fiber optic transceiver.

4 Claims, 2 Drawing Sheets

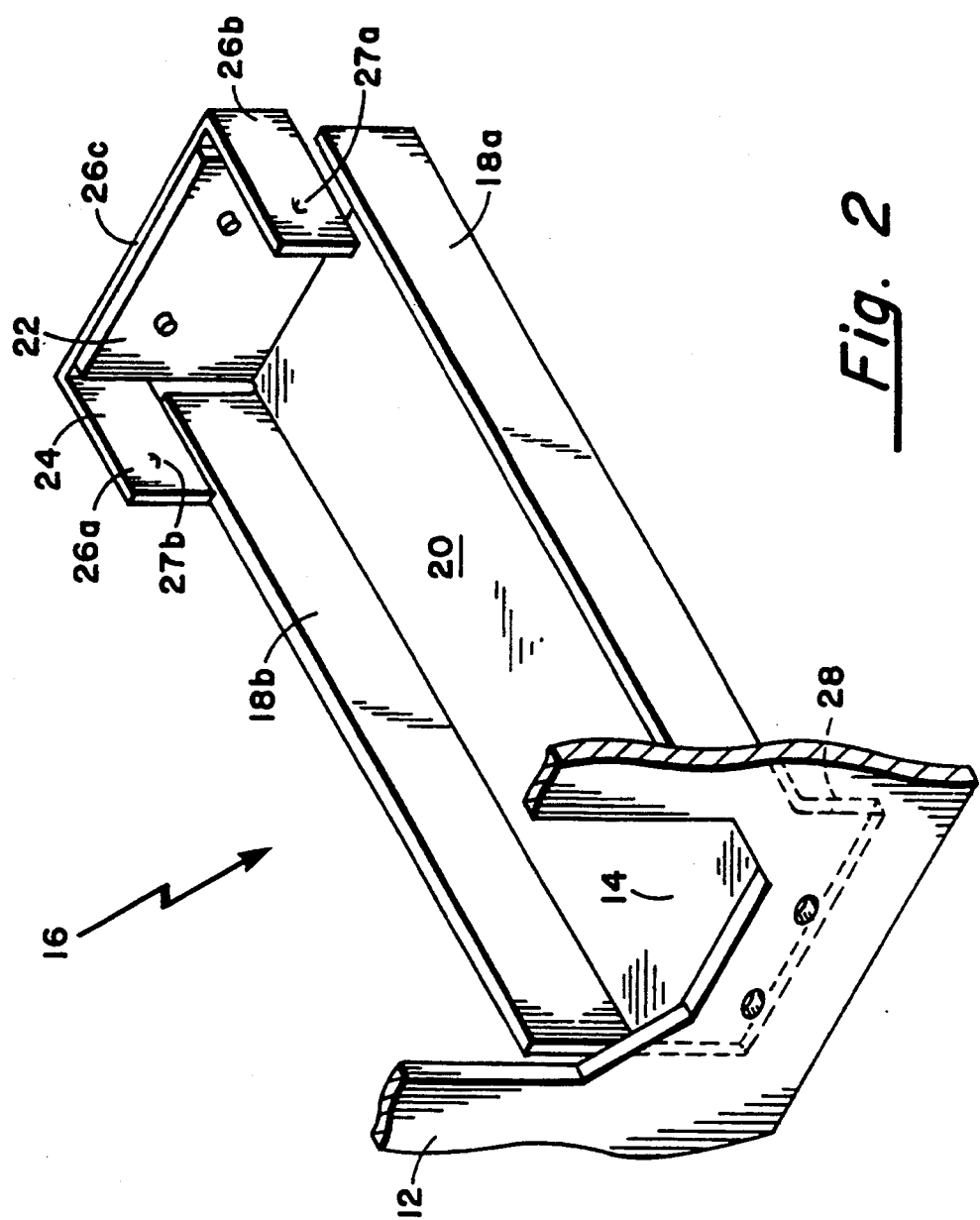

FIBER OPTIC TRANSCEIVER MOUNTING BRACKET

BACKGROUND OF THE INVENTION

The present invention relates to the field of mounting brackets, and more particularly to the field of fiber optic transceiver mounting brackets used in telecommunications.

As is known in the art, telecommunications equipment such as fiber optic transceivers, are usually placed in a dedicated room containing many types of telecommunications equipment. Most of the telecommunication equipment, including such fiber optic transceivers, is heat and shock sensitive. Further such equipment generally has cables connected to the equipment. For example, for a fiber optic transceiver which converts from fiber optic cabling to copper wire cabling one arrangement has the fiber optic cabling attached to the front and copper wire cabling attached at the rear. Such fiber optic transceivers are placed or mounted in the dedicated telecommunications room so as to allow for easy access to the fiber optic transceiver during maintenance and installation procedures, and to allow air flow around the protruding leads or wires.

One approach to mounting fiber optic transceivers in a dedicated telecommunications room, for example, is to place the fiber optic transceivers on top of existing equipment or on a ordinary shelf. One problem with this approach is that the fiber optic transceiver tends to be unstable and easily dislodged or disturbed when service technicians are accessing equipment in the telecommunications room. This approach can also present accessibility problems to a specific transceiver during maintenance/installation procedures.

Another approach is to place the fiber optic transceivers on an ordinary shelf and secure them to the shelf with a fastener device. Such an approach tends to require an abundant amount of space because transceivers cannot be stacked closely together. The fiber optic transceiver may also be secured by fastening it to a wall. One problem with this approach is that protruding wires will bend when forced against the wall.

Still another approach is to mount the fiber optic transceiver with a CB-type microphone clip. One problem with this approach is that transceivers may accidentally be dislodged when maintenance workers are servicing other devices in the telecommunication room.

SUMMARY OF THE INVENTION

In accordance with the present invention, a bracket includes a wall having a plurality of openings, and a plurality of mounting members attached to the rear of the wall aligned to and extending generally perpendicularly from each of the plurality of openings to provide a seating receptacle for a packaged electronic device. With such arrangement a mounting bracket is provided that allows easy access to individual transceivers during installation, maintenance, and removal procedures.

In accordance with a further embodiment of the present invention, an assembly for mounting fiber optic transceivers includes a front wall having a plurality of openings, a plurality of mounting members attached to the rear of the wall and extending generally perpendicularly from each of the plurality of openings, each of the mounting members further including a base, a pair of side walls coupled to the base and a rear wall coupled to said base, and a flexible clamp member attached to the rear wall, the flexible clamp member having a pair of short wall portions impressed at each end to provide securing dimples and an integral back wall portion. With such arrangement an assembly is provided that allows easy access to individual transceivers during installation, maintenance, and removal procedures. In addition, such an arrangement provides the necessary air flow to transceivers mounted in a telecommunications room.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 2 is a sectional view taken along line 2—2 of FIG. 1 showing a mounting member secured to the mounting bracket of FIG. 1.

DESCRIPTION OF PREFERRED EMBODIMENT

Figure 1:
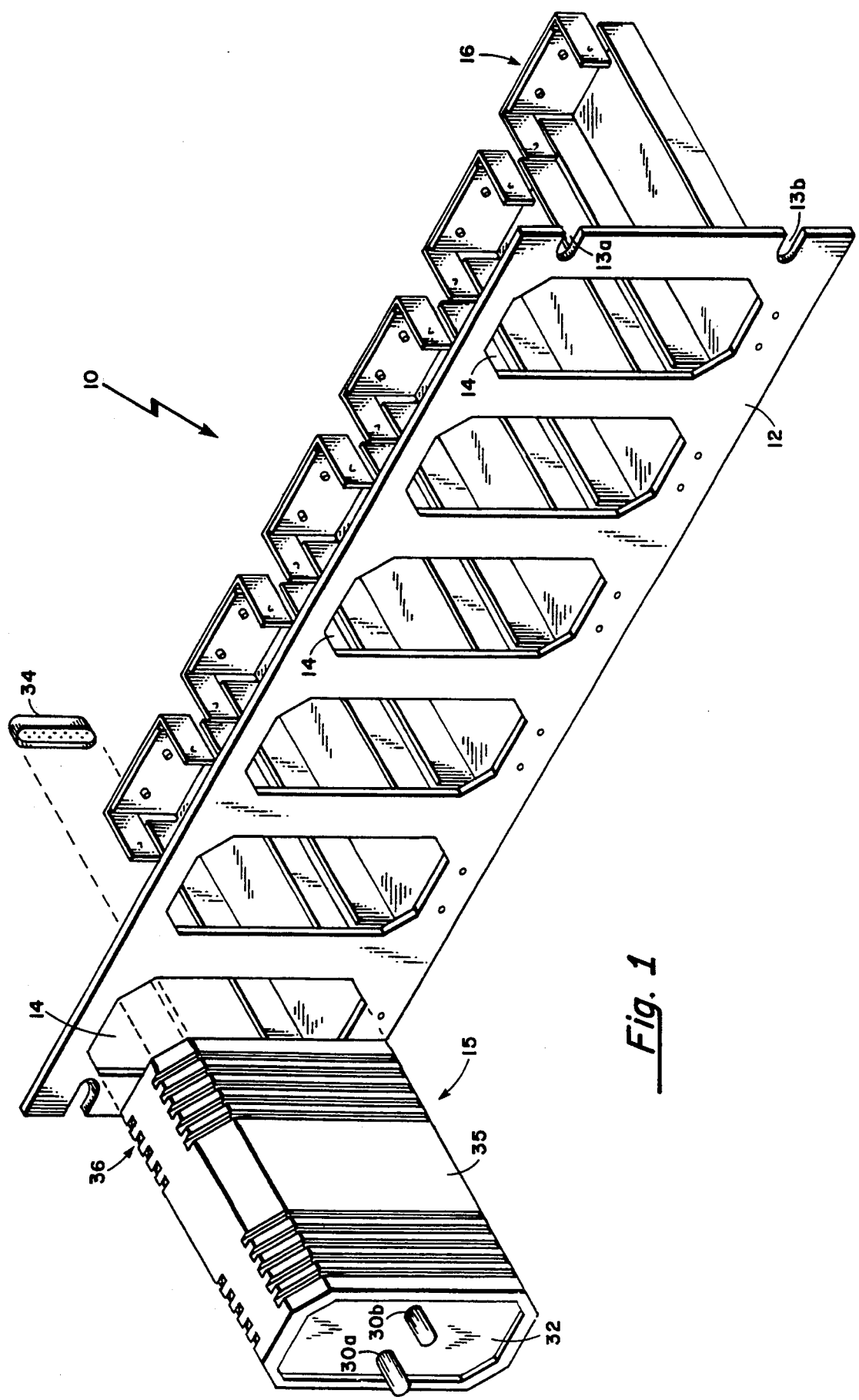
FIG. 1 is an exploded isometric view of a mounting bracket and fiber optic transceiver.

Referring now to FIG. 1, a bracket 10 is shown to include a front plate 12 having a plurality of openings 14 for placement of a corresponding plurality of packaged electronic devices such as a fiber optic transceiver 15. The front plate 12 can be made from any material which is reasonably rigid. It is preferred to provide the front plate 12 from a steel. It is also preferred that the front plate 12 have at least a thickness of about ⅛ inch. Alternatively the front plate 12 can be provided from aluminum. Preferably, if aluminum, it should have a thickness greater than ⅛ inch.

It is further preferred that the size and shape of the openings 14 conform to the size and shape of the fiber optic transceiver 15 to be mounted. In the preferred embodiment the openings 14 are shown as being generally octagonal in shape to accommodate the shape and dimensions of a Chipcom Fiber Optic Ethernet Transceiver which is manufactured by Chipcom Corporation of Southborough, Mass. However, the openings 14 may be designed to accommodate any size and shape of packaged electronic devices. The number of openings 14 may vary. Here the front plate 12 has six openings to accommodate six devices.

The front plate 12 is also shown as having a plurality of notches 13a and 13b to aid in mounting the front plate 12 to an external rack (not shown).

Affixed to the lower back portion of the front plate 12 is a plurality of mounting members 16. Each mounting member 16 is affixed and extends perpendicularly from the back of the front plate 12 at the lower portion of each of the openings 14.

Referring to FIG. 2, an exemplary one of the mounting members 16 is shown having two sides walls 18a and 18b extending perpendicularly from a base 20. The mounting member 16 further includes a rear wall 22 extending perpendicularly from the base 20, and rising from the base 20 at approximately twice the height as the side walls 18a and 18b. The side wall 18a, 18b, and rear wall 22 are integral to the base 20 and are provided by bending up portions of the base 20 to provide the respective wall portions. Attached to the rear wall 22 is flexible clamp member 24. Flexible clamp member 24 here has a pair of short side wall portions 26a and 26b, and an integral back wall portion 26c. These wall portions 26a, 26b, and 26c have an overall shape provided to accommodate the shape of the corresponding electrical device. The flexible clamp member 24 is used to secure the electrical device or assembly when mounted through the opening 14 in the front plate 12. It is preferred to form the flexible clamp member 24 from a metal such as brass. The flexible clamp member 24 can have a thickness of about 1/16 to 1/32 inch. The flexible clamp member 24 is impressed at each end to provide securing dimples 27a and 27b. The flexible clamp member 24 with its securing dimples 27a and 27b secures a fiber optic transceiver (not shown) which is seated through the front opening 14 and on the base 20 (of FIG. 1) and placed against the back wall 22. The flexible clamp member 24 is secured to the back wall 22 by rivets.

The mounting member 16 is affixed to the front wall 12 through a bend 28 of the base 22 via spot welds or rivets to the front wall 12.

Referring again to FIG. 1, the depth of the extension of the mounting member 16 should be such that when a packaged electronic device 15 is placed through the opening 14 of face plate 12 the packaged electronic device 15 extends out from the face plate 12 approximately ¼ inch. This facilitates easy removal of the packaged electronic device 15 from the mounting bracket 10. When the packaged electronic device 15 is a fiber optic transceiver it will typically include a fiber optic transmit connector 30a and a fiber optic receive connector 30b on its front face 32, and a 15 pin AUI connector 34 on its rear plate.

The packaged electronic device 15 has a case 35 with a plurality of ridges 36 disposed toward the rear portion of the case 35, as shown. When the packaged electronic device 15 is placed through the opening 14 of the front plate 12, the packaged electronic device 15 is secured in the mounting member 16 by the dimples 26a and 26b of the flexible clamp member 24 (of FIG. 2) seating in the ridges 36 on the case 35 of the packaged electronic device 15.

Having described a preferred embodiment of the invention, it will now become apparent, to one of skill in the art that other embodiments incorporating its concepts may be used. It is felt therefore, that this embodiment should not be limited to the disclosed embodiment, but rather should be limited only by the spirit and scope of the appended claims.

What is claimed:

1. An assembly for mounting fiber optic transceivers, comprising:
    a front wall having a plurality of openings;
    a plurality of mounting members attached to a rear of the front wall and extending perpendicularly from each of the plurality of openings, each of the mounting members including:
    a base;
    a pair of side walls coupled to the base and a rear wall coupled to said base; and
    a flexible clamp member attached to the rear wall, the flexible clamp member having a pair of short wall portions impressed at each end to provide securing dimples and an integral back wall portion.

2. The assembly according to claim 1 wherein the front wall includes a plurality of notches to enable attachment to an external rack.

3. The assembly according to claim 1 wherein the flexible clamp member is comprised of a brass 4. An arrangement comprising:
    a plurality of fiber optic transceivers;
    a plate having a plurality of openings;
    a plurality of mounting members extending perpendicularly from each of the plurality of openings on a back of the plate, said mounting members including:
    a base;
    a pair of walls coupled to said base;
    a back wall; and
    A flexible clamp member, coupled to the back wall, said flexible clamp member having a pair of side wall portions each having a dimpled portion to receive a fiber optical transceiver.

* * * * *